United States Patent [19]

Ermacora et al.

[11] Patent Number: 4,848,069
[45] Date of Patent: Jul. 18, 1989

[54] MOWER

[75] Inventors: Rino Ermacora, Saverne; Roland Helfer, Lampertheim, both of France

[73] Assignee: Kuhn, s.a., Cedex, France

[21] Appl. No.: 136,335

[22] Filed: Dec. 22, 1987

[30] Foreign Application Priority Data

Dec. 22, 1986 [FR] France .................. 86 18133

[51] Int. Cl.[4] ............................................. A01D 34/66
[52] U.S. Cl. ......................................... 56/15.8; 56/13.6
[58] Field of Search ............... 56/15.8, 13.6, 16.2, 56/6

[56] References Cited

U.S. PATENT DOCUMENTS

| | | | |
|---|---|---|---|
| 3,345,808 | 10/1967 | van der Lely | 56/6 |
| 3,550,360 | 12/1970 | van der Lely | 56/6 |
| 3,834,142 | 9/1974 | Johnston et al. | 56/15.8 |
| 4,048,790 | 9/1977 | Zweegers | 56/13.6 |
| 4,135,349 | 1/1979 | Schwertner | 56/6 |
| 4,218,865 | 8/1980 | Chaumont et al. | 56/15.8 |
| 4,253,294 | 3/1981 | Zweegers | 56/13.6 |
| 4,428,181 | 1/1984 | van Staveren et al. | 56/13.6 |
| 4,538,400 | 9/1985 | Hotles | 56/6 |
| 4,601,162 | 7/1986 | Wessel | 56/6 |
| 4,622,806 | 11/1986 | Bahnman et al. | 56/6 |
| 4,723,396 | 2/1988 | Ermacora | 56/16.2 |

FOREIGN PATENT DOCUMENTS

| | | |
|---|---|---|
| 0116660 | 8/1984 | European Pat. Off. . |
| 2717855 | 11/1977 | Fed. Rep. of Germany . |
| 2355439 | 1/1978 | France . |
| 455931 | 3/1968 | Switzerland . |
| 2048639 | 12/1980 | United Kingdom . |

*Primary Examiner*—Paul J. Hirsch
*Attorney, Agent, or Firm*—Oblon, Spivak, McClelland, Maier, & Neustadt

[57] ABSTRACT

The mower comprises at least two mowing groups 6, each of the at least two mowing groups 6 being composed of a cutting bar 8 equipped with cutting elements, the cutting bars 8 being connected to one another by a joint 9 and the mowing groups 6 being connected to the chassis 1 by a suspension device 12, 20, 18; 12, 20, 39. The suspension device 12, 20, 18; 12, 20, 39 comprises an intermediate structure 12 movably connected to the chassis 1 by a connecting device 18; 20, 39. Each one of the at least two mowing groups 6 is connected to the intermediate structure 12 by a joint 16 having an axis at least approximately perpendicular to the vertical plane containing the longitudinal axis of the corresponding cutting bar 8. The joints 16 are capable of movement in the direction crosswise to the direction of work 25 in relation to the intermediate structure 12.

9 Claims, 5 Drawing Sheets

MOWER

FIELD OF THE INVENTION

This invention relates to a mower comprising a chassis and at least two mowing groups each composed of a cutting bar equipped with cutting elements. The cutting bars are connected to one another by means of a joint, and the mowing groups are connected to the chassis with a suspension device.

BACKGROUND OF THE INVENTION

Such a mower is known comprising two mowing groups the cutting bars of which are aligned and placed crosswise to the direction of work so as to form a uniform cutting front. The two cutting bars are connected to one another by one or two cylindrical joints with a geometric axis at least approximately parallel to the direction of work. The two cutting bars comprise rotary cutting elements which are driven in rotation by a separate belt transmission for each cutting bar. The power necessary during work transits via a transmission housing surmounting the outermost rotary cutting element of each cutting bar and is then distributed to each rotary cutting element of the corresponding cutting bar by transmission elements housed on the inside of the housing of the cutting bar. This may be accomplished, for example, by toothed wheels that mesh with one another and on the shafts of some of which are mounted rotary cutting elements. This makes it possible to improve somewhat the qualities of the cutting of a mower of great width in rough terrain, but especially makes it possible to increase the reliability of the mower because the bending forces to which the two cutting bars of the known mower are subjected when it works in rough terrain are slighter than if the mower comprises a single cutting bar of the same work width.

In practice, it has been shown that the degrees of freedom possessed by each mowing group of this known mower are, however, insufficient to assure a maximum adaptability of the machine to the most marked reliefs of the terrains where this type of machine performs.

Another mower is known comprising a mowing group comprising, on the one hand, a cutting bar equipped with rotary cutting elements and, on the other hand, a carrying structure. The carrying structure of the cutting bar is connected to the chassis by a pulled parallelogram device. The pulled parallelogram device comprises three connecting rods: an upper central connecting rod and a lower connecting rod at each end of the mowing group. The pulled parallelogram device makes it possible to maintain a constant stable position of the cutting bar in relation to the ground. In addition, the pressure on the ground produced by the weight of the mowing group that rests there is reduced by a compensating system of springs. The combination of these two means makes it possible to obtain a good adaptability of the mower to the relief of the terrain on which it performs.

On the other hand, since the cutting bar is in a single piece, the qualities of the known mower become blurred as soon as the work width of the machine is increased. This is due to the fact that, when the cutting bar made in one piece encounters an obstacle at any spot on its width, the entire cutting bar moves to overcome this obstacle. Accordingly, the cutting quality of the known mower becomes unacceptable for the users beyond a certain work width.

OBJECT OF THE INVENTION

The object of this invention is to solve or ameliorate the problems of the known mowers to obtain a mower of great width having several cutting bars with an optimum adaptability to the ground.

SUMMARY OF THE INVENTION

For this purpose, the mower according to the invention is characterized by the fact that the suspension device comprises an intermediate structure connected to the chassis by a connecting device so as to have a certain number of degrees of freedom in relation to the chassis. Each mowing group is connected to the intermediate structure by a connecting joint with a geometric axis which is at least approximately perpendicular to an at least approximately vertical plane containing the longitudinal axis of the corresponding cutting bar and that can move in a direction crosswise to the direction of work in relation to the intermediate structure.

This arrangement of the suspension device has the advantage of being able to connect several cutting bars to one another to build a mower of great cutting width, while having for each cutting bar a large number of degrees of freedom in relation to the neighboring cutting bar and in relation to the ground. This makes it possible to have a very great adaptability of the set of cutting bars to the ground. This in turn permits the mower to perform an optimum cutting of the products to be harvested.

In the invention, it is provided that the connecting device that connects the intermediate structure to the chassis forms, with the intermediate structure and the chassis, a deformable quadrilateral. This arrangement makes it possible to select the desired clearance curve of the cutting bars when they encounter an obstacle and to assure that the cutting bars do not have a tendency to point into the obstacle.

Advantageously, the deformable quadrilateral is pulled during work. This arrangement further improves the clearance of the cutting bars in case of encounter with an obstacle.

Preferably, the connecting device that connects the intermediate structure to the chassis forms, with the intermediate structure and the chassis, approximately a deformable parallelogram device. This arrangement makes it possible to have a maximum following of the relief of the terrain for the set of mowing groups, while maintaining approximately their stable position in relation to the ground.

Advantageously, the deformable parallelogram device is pulled during work. This arrangement makes it possible to have a good clearing path of the cutting bars when they encounter an obstacle and thus not to have a tendency to point into it.

In the invention it is also provided that all the joints of the deformable parallelogram device are swivelling joints. Advantageously the lateral translation of the intermediate structure in relation to the chassis is blocked by a lateral holding element acting at least approximately in the middle part of the intermediate structure. Thanks to this arrangement, the cutting bars have a great mobility in relation to one another to adopt optimally to the ground, while preventing the mowing groups from coming in contact with elements of the body of the mower, particularly during turning work.

According to an advantageous embodiment of the invention, the lateral holding element is connected to the intermediate structure by means of a ball joint and to the chassis by means of a cylindrical joint with an axis directed crosswise to the direction of work, the plane containing the axis of the cylindrical joint and the center of the ball joint being at least approximately parallel to the planes containing the joints of the parallelogram connecting device. The intermediate structure can thus move upward and turn in relation to the chassis.

According to an additional characteristic of the invention, elastic elements push the mowing groups toward one another. This arrangement makes possible a greater lateral stability of the mowing groups.

According to another additional characteristic of the invention, a load-lightening system is provided which acts on the mowing groups to improve the adaptation of the mowing groups to the ground.

According to another additional characteristic of the invention, a lifting device is also provided which acts on the mowing groups to take them off the ground during transport of the mower.

According to another additional characteristic of the invention, it is further provided that the drive elements transmitting movement to the cutting elements of each cutting bar are synchronized by means of a synchronizing device which can advantageously be a telescopic drive shaft with universal joints.

In the invention it is also provided that, in top view, the chassis can have a diamond shape the large axis of which extends crosswise to the direction of work and the small axis of which extends at least approximately in the direction of work. A chassis element extends along the small axis and connects the two front sides of the diamond to the two rear sides of the diamond.

Finally, it is also provided in the invention that complementary work elements can be associated with the cutting bars.

BRIEF DESCRIPTION OF THE DRAWINGS

FIG. 3a is a rough plan view of a return element and its connecting element.

In these views, for the sake of clarity, the tongue and the protectors of the mowing groups have not been represented.

DETAILED DESCRIPTION OF THE PRESENTLY PREFERRED EMBODIMENTS

The First Embodiment

Figure 1:
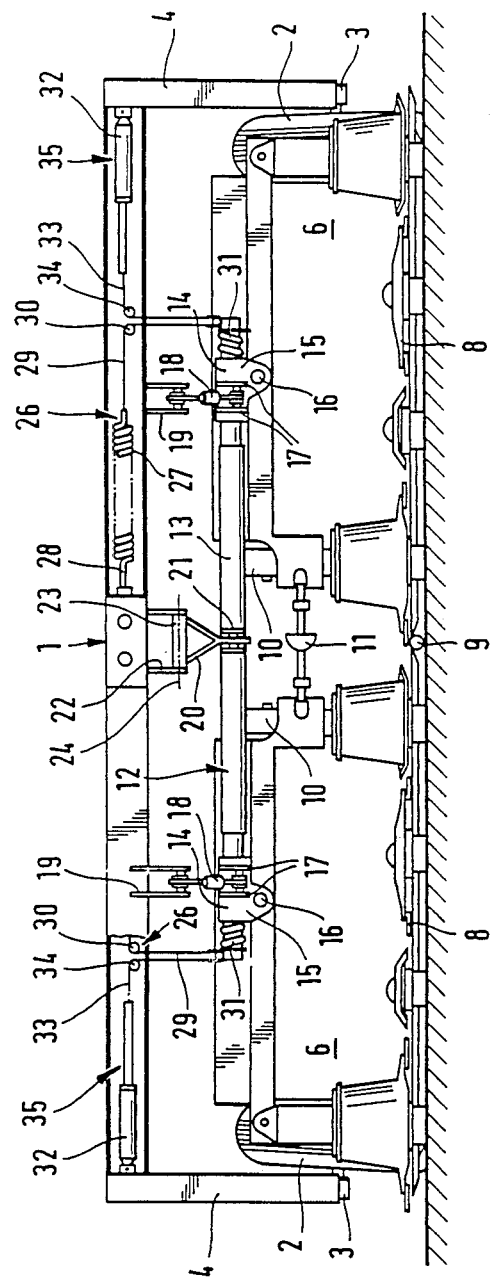
FIG. 1 is a front view of the entire mower according to a first embodiment of the invention.
Figure 2:
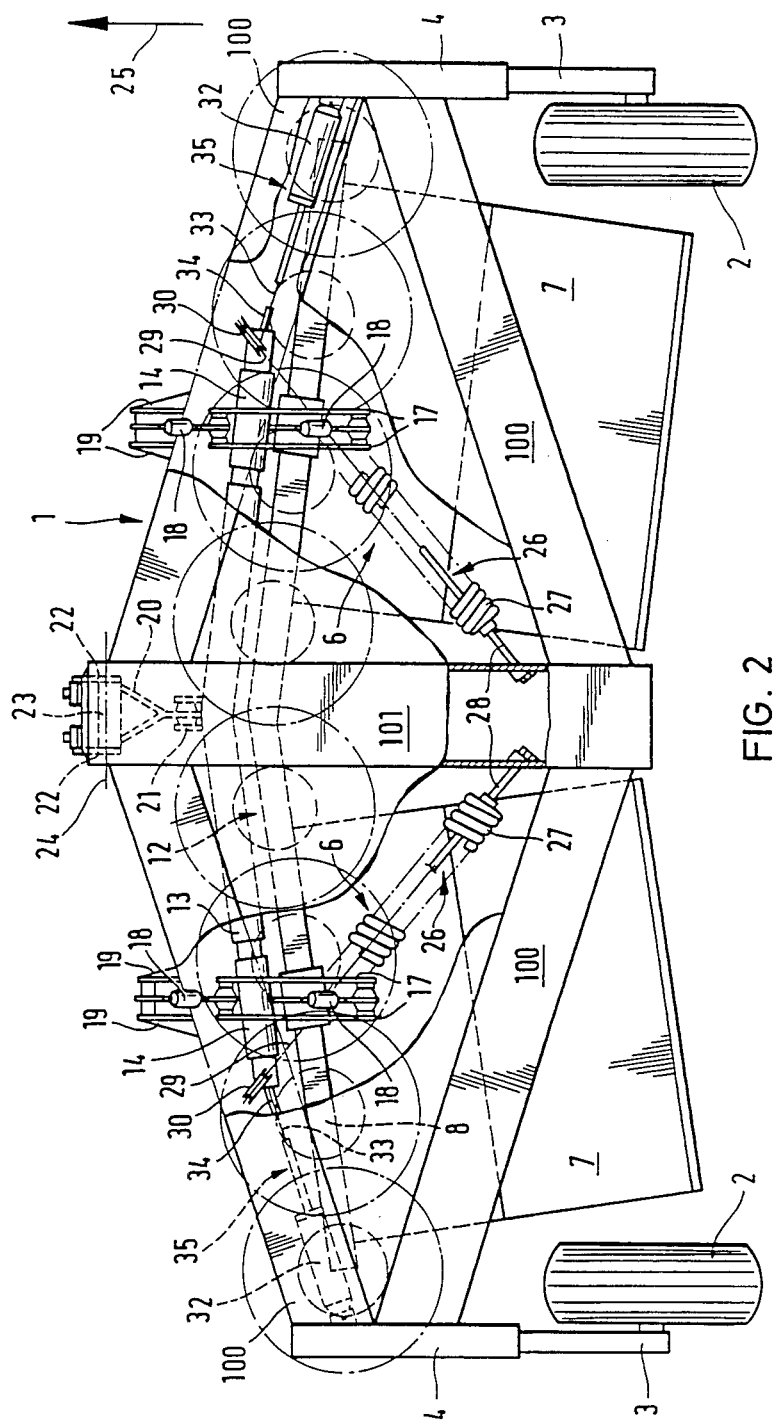
FIG. 2 is a top view of the entire mower of FIG. 1.
Figure 3:
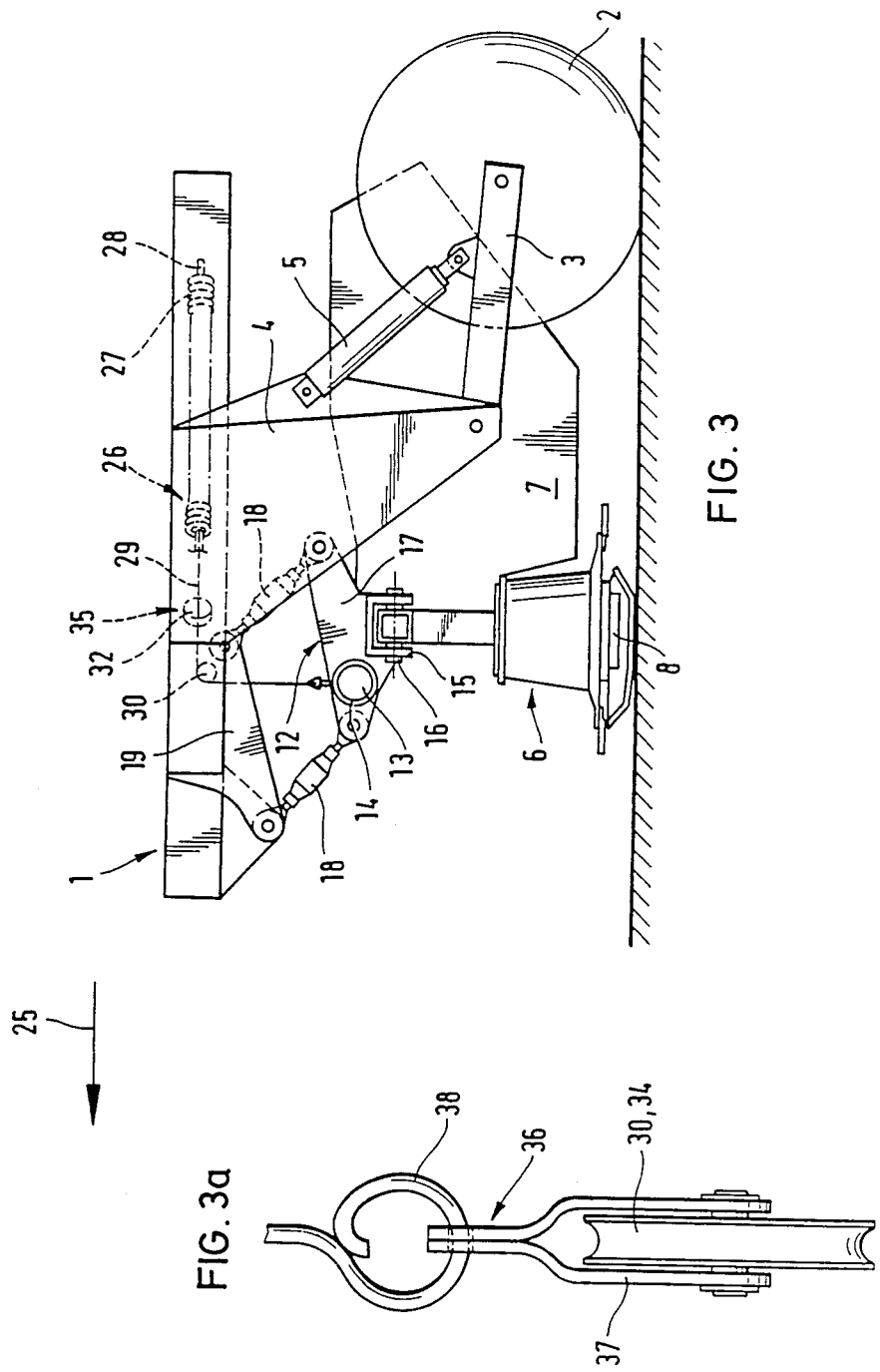
FIG. 3 is a side view of the entire mower of FIGS. 1 and 2.

FIGS. 1, 2, and 3 show the entire mower according to a first embodiment of the invention.

The mower comprises a chassis 1. To make a maximum of details accessible, the chassis 1 is shown cut away in FIGS. 1 and 2. The chassis 1, in top view, has a diamond shape the large axis of which extends crosswise to the direction of work 25 and the small axis of which extends at least approximately in the direction of work 25.

Each side of the diamond consists of a beam 100. The beams 100 are connected in the middle part of the mower to a central beam 101 extending at least approximately along the small axis of the diamond. At their outside ends, the beams 100 are connected to uprights 4.

The chassis 1 rests on the ground thanks to wheels 2 held by wheel arms 3 connected to the uprights 4 of the chassis 1. The uprights 4 extend downward at each end of the chassis 1. Each wheel arm 3 is driven by a hydraulic cylinder 5 which makes it possible to raise the machine in relation to the ground during transport phases or to avoid obstacles.

Mowing groups 6, each equipped with a conditioning group 7 known to those of ordinary skill in the art, are suspended from the chassis 1. Cutting bars 8 connected to one another by a join 9 extend in the lower part of the mowing groups 6. Because between them the cutting bars 8 form an obtuse angle open toward the back of the machine, the joint 9 is a ball joint. This makes it possible to adjust the pointing of each cutting bar 8 independently of the other cutting bar 8.

Each cutting bar 8 is driven by a separate hydraulic motor 10. Because of this, the cutting bars 8 are synchronized by a telescopic drive shaft 11 with universal joints.

The mowing groups 6 are connected to the chassis 1 by a suspension device. The suspension device comprises an intermediate structure 12 comprising an intermediate beam 13 extending above the cutting bars 8 and at least approximately parallel to the cutting bars 8. (Note that, as shown in the FIG. 2, the intermediate bar 13 extends on both sides of the central beam 101.) At each end of the intermediate beam 13, a cylindrical surface is provided on which a guide 14 slides that is part of a suspension yoke 15 for each mowing group 6. The mowing groups 6 are each connected to the corresponding suspension yoke 15 by a cylindrical connecting joint 16 with an axis perpendicular to an at least approximately vertical plane containing the longitudinal axis of each cutting bar 8.

Each suspension yoke 15 comprises two plates 17 at least approximately parallel to one another and, between them, able to receive the lower ends of a pair of connecting rods 18 having a swivelling joint at their two ends. The upper ends of the connecting rods 18 are gripped in anchoring yokes 19 solid with the chassis 1.

The two units each of which consists of a pair of connecting rods 18, an anchoring yoke 19, and a suspension yoke 15 thus form two deformable parallelograms. The intermediate beam 13 and, consequently, the mowing groups 6 are held laterally in relation to the chassis 1 by a connecting rod 20 having a swivelling joint at its end connected to a yoke 21 solid with the intermediate beam 13. The yoke 21 extends at least approximately into the middle part of the intermediate beam 13. In addition, the connecting rod 20 is connected to the chassis 1 via a yoke 22 by a cylindrical joint 23 constituting its upper end. The axis 24 of the cylindrical joint 23 is directed crosswise to the direction of work 25.

The connecting rod 20 is made so that the plane containing the axis 24 of the cylindrical joint 23 and the center of the swivelling joint connecting the connecting rod 20 to the intermediate beam 13 is at least approximately parallel to the planes containing the joints of the front and back connecting rods 18 of the parallelogram connecting device.

The component of the weight of each mowing group 6 resting on the ground is reduced by a load-lightening system 26. Each load-lightening system 26 comprises a tension spring 27 extending at least approximately horizontally, so as to extend into the space delimited by the chassis 1. Each tension spring 27 is connected by a tie-rod 28 to the chassis 1 and acts via a cable 29 and a return pulley 30 directly on one end of the intermediate beam 13 to create an at least approximately vertical action.

It can be seen clearly in FIG. 1 that the mower is equipped with elastic elements 31 mounted coaxially with the intermediate beam 13. Each elastic element 31 is preferably made in the form of a compression spring. In any event, each of the elastic elements 31 bears at one end against the intermediate beam 13 and at the other end against the guides 14 of the suspension yokes 15. Thus, the elastic elements 31 push the mowing groups 6 towards one another via the suspension yokes 15.

In addition, the mower shown in FIGS. 1, 2, and 3 is equipped with a lifting device 35 for lifting the mowing groups 6. The device 35 makes it possible to increase the distance between the ground and the machine in the phases of transport or of overcoming obstacles. The lifting device 35 comprises two identical units that are symmetrical to one another in relation to the middle axis of the mower. Each of the units constituting a lifting device 35 comprises a hydraulic cylinder 32 that extends at least approximately horizontally and that is contained in the space delimited by the chassis 1. Each cylinder 32 is fastened at one of its ends to one of the lateral ends of the chassis 1 and, at the other one of its ends (preferably, its rod end) to a cable 33. The cable 33 is wound on a return pulley 34 before being fastened to one end of the intermediate beam 13 in the vicinity of the action point of the cable 29 of the load-lightening system 26. Each cylinder 32 thus acts on the associated mowing group 6 in an at least approximately vertical direction.

In FIG. 3a, a system 36 for fastening the return pulleys 30, 34 to the chassis 1 is seen. The cables 29, 33 attached to the tension spring 27 and to the cylinder 32, respectively, extend at least approximately horizontally until they begin to be wound on their corresponding return pulley 30, 34, after which they are directed downward to be fastened at their corresponding anchoring point on the intermediate beam 13. The angle that each cable 29, 33 makes with the vertical after having left the corresponding return pulley 30, 34 is not constant during work, but varies as a function of the various positions occupied by the mowing groups 6. Because of this, and in order that each cable 29, 33 always remains tangential to its corresponding return pulley 30, 34 and does not take positions in relation to it which would risk having it leave the groove cut in the corresponding return pulley 30, 34, the corresponding return pulley 30, 34 follows the movements of the corresponding cable 29, 33. This is possible because a suspension fork 37 mounting of each of the return pulleys 30, 34 is held suspended by a hook 38 fastened to the chassis 1. The hook 38 gives each of the return pulleys 30, 34 all the freedom of movement they need.

The Second Embodiment

Figure 4:
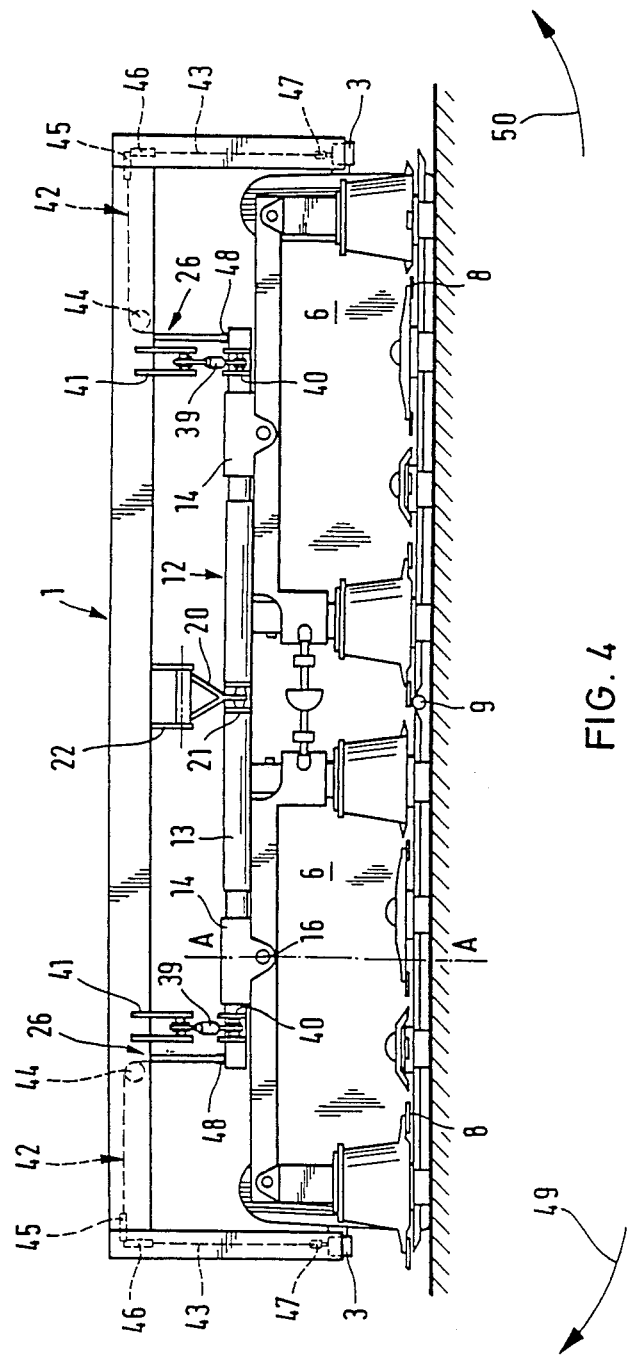
FIG. 4 is a front view of the entire mower according to a second embodiment of the invention.
Figure 5:
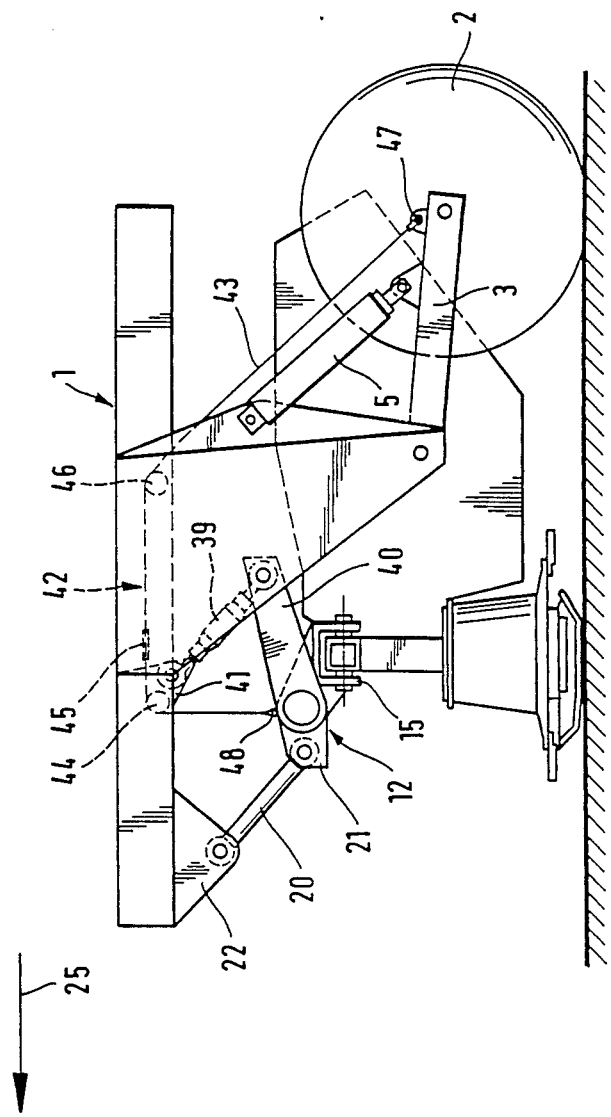
FIG. 5 is a side view of the entire mower of FIG. 4.

In FIGS. 4 and 5, a second embodiment of a mower according to the invention has been shown. Only the different points in this second embodiment in relation to the first embodiment shown in FIGS. 1 to 3 will be described below.

One of the distinguishing characteristics of the second embodiment in relation to the first embodiment is in the arrangement of connecting rods 39 connecting the intermediate structure 12 to the chassis 1. The intermediate beam 13 forms a deformable parallelogram with the connecting rod 20 arranged in the same way as in FIGS. 1 to 3, with a connecting rod 39 connected to each of the ends of the intermediate beam 13, and with the chassis 1. As stated above, the connecting rod 20 is identical with the one of FIGS. 1 to 3 and made in the same way, whereas the other two connecting rods 39 are parallel and located in the same plane behind the connecting rod 20 and at least approximately parallel to it. The connecting rods 39 are of the swivelling type at both ends, and they are no longer fastened to the suspension yokes 15 as in FIGS. 1, 2, and 3. Instead, each connecting rod 39 is directly connected by its lower end to a yoke 40 solid with the intermediate beam 13, and by its upper end to a yoke 41 solid with the chassis 1.

The other feature of the second embodiment in comparison with the embodiment of FIGS. 1 to 3 resides in a lifting device 42. The lifting device 42 is always in two parts, each acting on one end of the intermediate beam 13. On the other hand, the lifting device 42 no longer comprises a cylinder as in the first embodiment, but only a cable 43 on each side of the machine extending to the inside of the chassis 1 and winding on three return pulleys 44, 45, 46. A first end 47 of each cable 43 receives the lifting movement and is anchored to a point on the corresponding wheel arm 3, while a second end 48 of each cable 43 is anchored on the intermediate beam 13 in the vicinity of the anchoring point of the cable 29 of the load-lightening system 26 (which is not shown, but which is the same as in the first embodiment). This arrangement of the cables 43 is able to transmit to the intermediate beam 13 the movement of the wheel arms 3 which is imparted to them by the hydraulic cylinders 5. The intermediate beam 13 thus is raised when the wheels 2 ar lowered, both movements working together to obtain a sufficient distance between the mower and the ground during transport phases. At least the return pulleys 44 are mounted identically with the return pulleys 30, 34 described with relation to FIG. 3a, for the same reasons as those which have already been mentioned.

Operation of the Mowers

Both embodiments operate as explained below.

Because of the symmetry between the right and left mowing groups 6, only the different cases of overcoming obstacles that can be encountered, for example, by the right mowing group will be described. Disregarding differences in their nature, the obstacles that the mowing group can encounter are discernible according to their position in relation to a vertical plane passing through the cylindrical joint 16 and shown in FIG. 4 by a line A—A.

The indications of right or left are obviously to be taken for an observer who is behind the machine and looking in the direction of travel 25.

For an obstacle located in the path of the right cutting bar 8 to the right of the line A—A, the mowing group 6 under consideration swivels around the joint 9 in a direction 49. Accordingly, the right end of the right cutting bar 8 is raised, while the joint 9 rests on the ground and, therefore, the left cutting bar 8 also rests on the ground, insensitive to the dodging movement of the right cutting bar 8. The variations of the relative position of the two mowing groups are compensated for by rotations at the level of the cylindrical joints 16, by translations of the guides 14, and by an inclination of the intermediate beam 13 in relation to the chassis 1 in the direction 49.

On the other hand, for an obstacle located in the path of right cutting bar 8 between the joint 9 and the line A—A, the joint 9 is raised. Accordingly, the right mowing group 6 swivels around its cylindrical joint 16 in a direction 50, and the left mowing group 6 also swivels around its cylindrical joint 16, but in the direction 49, the two outside ends of the cutting bars 8 resting on the ground. In this case, the intermediate beam 13 remains at least approximately horizontal, but it is raised while following the joint 9 in its ascension. To compensate for the relative movements of the mowing groups 6, the guides 14 slide on the intermediate beam 13 in opposite directions while separating from one another.

The pointing of the cutting bars 8 (i.e., the cutting angle between the cutting bar 8 and the ground) is governed by modification of the length of the connecting rods 18, 39, which are adjustable.

As stated above, the two mowing groups 6 are arranged in an obtuse angle open toward the back of the machine. Because of this, the crop cut by each mowing group 6 and which is ejected to the rear of the machine is combined at least approximately into a single windrow.

Caveat

Obviously, numerous modifications and variations of the present invention are possible in light of the above teachings. It is therefore to be understood that, within the scope of the appended claims, the invention may be practiced otherwise than as specifically described herein.

We claim:

1. A mower comprising:
   (a) a chassis which, during use of said mower, has a direction of advance, said chassis have a vertical plane of symmetry at least approximately parallel to said direction of advance;
   (b) a first mowing group and a second mowing group, each of said mowing groups comprising:
      (i) a cutting bar having a longitudinal axis which extends crosswise to said direction of advance, having a first end adjacent to said vertical plane of symmetry, and having a second end remote from said vertical plane of symmetry and
      (ii) at least one cutting element mounted on said cutting bar;
   (c) a first joint connecting the first ends of said cutting bars and permitting said cutting bars to pivot relative to each other;
   (d) an intermediate beam extending crosswise to said direction of advance between said chassis and said mowing groups on both sides of said vertical plane of symmetry, said intermediate beam having a first end, a center located at least approximately in said vertical plane of symmetry, and a second end;
   (e) a first suspension member slidably mounted on said first end of said intermediate beam for movement toward and away from said vertical plane of symmetry;
   (f) a second suspension member slidably mounted on said second end of said intermediate beam for movement toward and away from said vertical plane of symmetry;
   (g) a second joint connecting said first suspension member to said first mowing group and permitting said first mowing group to pivot relative to said first suspension member about an axis that is at least approximately perpendicular to a vertical plane containing said longitudinal axis of said cutting bar of said first mowing group;
   (h) a third joint connecting said second suspension member to said second mowing group and permitting said second mowing group to pivot relative to said second suspension member about an axis that is at least approximately perpendicular to a vertical plane containing said longitudinal axis of said cutting bar of said second mowing group;
   (i) two first connecting rods, each one of said two first connecting rods having:
      (i) a first end that is connected to said first suspension member for pivotal movement about a corresponding axis that is at least approximately perpendicular to said vertical plane of symmetry and
      (ii) a second end that is connected to said chassis for pivotal movement about an axis that is at least approximately perpendicular to said vertical plane of symmetry;
   (j) two second connecting rods, each one of said two second connecting rods having:
      (i) a first end that is connected to said second suspension member for pivotal movement about a corresponding axis that is at least approximately perpendicular to said vertical plane of symmetry and
      (ii) a second end that is connected to said chassis for pivotal movement about an axis that is at least approximately perpendicular to said vertical plane of symmetry; and
   (k) a third connecting rod having:
      (i) a first end that is connected to the center of said intermediate beam for pivotal movement about an axis that is at least approximately perpendicular to said vertical plane of symmetry and
      (ii) a second end that is connected to said chassis for pivotal movement about an axis that is at least approximately perpendicular to said vertical plane of symmetry;
   (l) wherein said two first connecting rods, said two second connecting rods, and said third connecting rod form with said chassis, said first and second suspension members, and said intermediate beam an at least approximately parallelogram.

2. A mower as recited in claim 1 wherein said first joint is a ball joint.

3. A mower as recited in claim 1 wherein said first and second suspension members are mounted on corresponding cylindrical surfaces on said intermediate beam.

4. A mower as recited in claim 1 wherein each of said first and second suspension members comprises two plates that are at least approximately parallel to one another and to said direction of advance and that receive the first end of a corresponding one of said first and second connecting rods therebetween.

5. A mower as recited in claim 1 wherein said third connecting rod is connected to said intermediate beam by means of a yoke that is solidly mounted on said intermediate beam.

6. A mower comprising:
   (a) a chassis which, during use of said mower, has a direction of advance, said chassis have a vertical plane of symmetry at least approximately parallel to said direction of advance;

(b) a first mowing group and a second mowing group, each of said mowing groups comprising:
  (i) a cutting bar having a longitudinal axis which extends crosswise to said direction of advance, having a first end adjacent to said vertical plane of symmetry, and having a second end remote from said vertical plane of symmetry and
  (ii) at least one cutting element mounted on said cutting bar;

(c) a first joint connecting the first ends of said cutting bars and permitting said cutting bars to pivot relative to each other;

(d) an intermediate beam extending crosswise to said direction of advance between said chassis and said mowing groups on both sides of said vertical plane of symmetry, said intermediate beam having a first end, a center located at least approximately in said vertical plane of symmetry, and a second end;

(e) a first guide slidably mounted on said first end of said intermediate beam for movement toward and away from said vertical plane of symmetry;

(f) a second guide slidably mounted on said second end of said intermediate beam for movement toward and away from said vertical plane of symmetry;

(g) a second joint connecting said first guide to said first mowing group and permitting said first mowing group to pivot relative to said first guide about an axis that is at least approximately perpendicular to a vertical plane containing said longitudinal axis of said cutting bar of said first mowing group;

(h) a third joint connecting said second guide to said second mowing group and permitting said second mowing group to pivot relative to said second guide about an axis that is at least approximately perpendicular to a vertical plane containing said longitudinal axis of said cutting bar of said second mowing group;

(i) a first connecting rod having:
  (i) a first end that is connected to said first end of said intermediate beam for pivotal movement about an axis that is at least approximately perpendicular to said vertical plane of symmetry and
  (ii) a second end that is connected to said chassis for pivotal movement about an axis that is at least approximately perpendicular to said vertical plane of symmetry;

(j) a second connecting rod having:
  (i) a first end that is connected to said second end of said intermediate beam for pivotal movement about an axis that is at least approximately perpendicular to said vertical plane of symmetry and
  (ii) a second end that is connected to said chassis for pivotal movement about an axis that is at least approximately perpendicular to said vertical plane of symmetry; and (k) a third connecting rod having:
  (i) a first end that is connected to the center of said intermediate beam for pivotal movement about an axis that is at least approximately perpendicular to said vertical plane of symmetry and
  (ii) a second end that is connected to said chassis for pivotal movement about an axis that is at least approximately perpendicular to said vertical plane of symmetry;

(l) wherein said first connecting rod, said second connecting rod, and said third connecting rod form with said chassis and said intermediate beam an at least approximately parallelogram.

7. A mower as recited in claim 6 wherein said first joint is a ball joint.

8. A mower as recited in claim 6 wherein said first and second guides are mounted on corresponding cylindrical surfaces on said intermediate beam.

9. A mower as recited in claim 6 wherein said third connecting rod is connected to said intermediate beam by means of a yoke that is solidly mounted on said intermediate beam.

* * * * *